Jan. 19, 1960

F. E. GILMORE 2,921,970

PROCESS FOR SEPARATING NORMAL ALIPHATIC HYDROCARBONS
USING ZEOLITIC MOLECULAR SIEVES

Filed April 15, 1957

INVENTOR.
F.E. GILMORE

BY *Hudson & Young*

ATTORNEYS

United States Patent Office 2,921,970
Patented Jan. 19, 1960

2,921,970

PROCESS FOR SEPARATING NORMAL ALIPHATIC HYDROCARBONS USING ZEOLITIC MOLECULAR SIEVES

Forrest E. Gilmore, Bartlesville, Okla., assignor to Phillips Petroleum Company, a corporation of Delaware Application April 15, 1957, Serial No. 652,943

11 Claims. (Cl. 260—676)

This invention relates to separation of hydrocarbons. In one aspect, this invention relates to a method of separation of normal aliphatic hydrocarbons from their mixtures employing a moving bed of a molecular sieve.

In the separation of fluids of close boiling points, various processes have been developed. One such process is based on the property of certain high surface area materials to preferentially absorb certain components from a mixture, so that the absorbed material will be richer in some components, leaving the unadsorbed portion enriched in the remaining components. In recent years, it has been found that certain artificial or natural zeolites will adsorb materials of a certain configuration or molecular size and completely reject other materials and thereby provide a means of making a substantially complete separation. These zeolites are known as "molecular sieves" and have been found of great advantage in separating straight chain hydrocarbons from other classes of hydrocarbons such as isoparaffins, naphthenes and aromatics. These "molecular sieves" have numerous pores of extremely small diameter intermediate the critical diameters of the molecules being separated. The separation is effected by the larger diameter molecules being unable to pass into these pores. In the separation of normal aliphatic hydrocarbons from other hydrocarbons, or straight chain organic compounds from other organic compounds, a molecular sieve having pores of a diameter of about 5 angstroms is frequently used.

According to prior art, to remove the sorbed material, the zeolite is stripped by means of a stripping gas such as nitrogen or steam. However, steam suffers from the disadvantage of causing a gradual loss in adsorbent capacity with continued use. Unless unreasonable quantities are used, nitrogen or other inert gas requires very high desorption temperatures to effect complete adsorbate removal. Additionally, since these materials are non-condensible at reasonable temperatures and pressures, the quantitative recovery of adsorbed material may be very difficult.

It is an object of this invention to provide an improved process for adsorption and recovery of the sorbate.

It is another object of this invention to provide a method of continuous countercurrent sorption and desorption of normal aliphatic hydrocarbons from a molecular sieve.

It is still anther object of this invention to provide an improved method for handling molecular sieve solids in a sorption-desorption process employing a contiguous gravitating bed of molecular sieve.

It is another object of this invention to provide a method of control of a continuous sorption-desorption process employing a gravitating bed of molecular sieve.

Other objects, as well as advantages and aspects of this invention will become apparent to those skilled from a study of the accompanying disclosure and drawings.

According to the invention, there is provided a process wherein a contiguous gravitating bed of molecular sieve passes through an upper solids distributing zone, a first vapor-solids separation zone, a first countercurrent vapor-solids contacing zone, a zone of introduction of a first vapor stream containing a normal aliphatic hydrocarbon, a second vapor-solids separation zone, a second vapor-solids countercurrent contacting zone, a zone of introduction of a second vapor stream containing a normal aliphatic hydrocarbon having a different number of carbon atoms than any normal aliphatic hydrocarbon in said first stream, and a bottom solids removal zone, countercurrently contacting said first vapor stream with solids in said first contacting zone and adsorbing a first normal aliphatic hydrocarbon on said sieve while desorbing a second normal aliphatic hydrocarbon, mentioned hereafter, from said sieve, collecting desorbed vapors in said first separation zone; countercurrently contacting said second vapor stream with solids in said second contacting zone and adsorbing a second normal aliphatic hydrocarbon on said sieve while desorbing said previously adsorbed first hydrocarbon from said sieve, collecting said desorbed vapors in said second separation zone; removing solids from the bottom of said bed of gravitating sieve and introducing into said solids another portion of said first vapor stream as a lift gas for said solids and lifting said solids to the top of said bed, and separating at least most of the vapors from said solids; and recovering said collected vapors as products of the process.

In the process of this invention the adsorbed normal aliphatic hydrocarbon, such as an n-paraffin, is desorbed by countercurrently contacting a molecular sieve containing the adsorbed hydrocarbon with a normal aliphatic hydrocarbon, such as another n-paraffin, having a different number of carbon atoms. The percent recovery is substantially higher employing such a desorbent than is obtained by stripping the sieve with inert gases such as nitrogen or steam under the same conditions.

The molecular sieve materials applicable in this invention are natural or synthetic zeolites and will be broadly referred to in this specification and the accompanying claims as zeolite.

Examples of natural zeolites which are applicable as molecular sieves include chabasite, phacolite, gmelinite, harmotome, and the like of a rigid three dimensional structure. These minerals are found naturally in three different forms, namely, fibrous, laminous and rigid three dimensional anionic networks. It is only the three dimensional network material which is useful as molecular sieves.

In the separation of normal aliphatic hydrocarbons from hydrocarbons of branched or cyclic structure, a molecular sieve of approximately 5 angstroms diameter is especially useful, such a material being of the chabasite group of minerals.

Materials adsorbed on a 5 angstrom sieve include normal paraffins up to at least 28 carbon atoms such as methane, ethane, propane, butane, pentane, hexane, heptane, octane, decane, dodecane, tetradecane, hexadecane, etc.; normal olefins such as butene, pentene, heptene, 2-nonene, 1-tetradecene, etc.; acetylenes such as ethyne, propyne, 2-butyne, 1-butyne, 2-pentyne, 1-pentyne, 2-heptyne, 2-hexyne, etc.; diacetylene such as 1,5-hexadiyne, 2,4-hexadiyne, etc.; as well as other normal unsaturated materials such as diolefins, vinylacetylenes, etc. Materials rejected by a 5 angstrom sieve include such materials as isoparaffins such as isobutane, isooctane and the other various isoparaffins; isohydrocarbons having one or more points of unsaturation; aromatics such as benzene, toluene, and the like; heterocyclics such as pyridine, alkylpyridines, etc.; cyclics of at least four members in the ring such as cyclobutane, methyl cyclopentane, cyclohexane, cyclohexene, cycloheptane, and the like. These materials are known in the art and their acceptance or rejection of molecules on the basis of critical molecular diameter is known to the art and no further explanation is required.

In particular, my invention is especially useful in removing low octane aliphatic hydrocarbons from a petroleum fraction of the gasoline boiling range. That is, the high octane compounds are primarily isoparaffins and aromatics while the normal aliphatic hydrocarbons, such as n-paraffins have poor octane ratings. For such a process, chabasite of about 5 angstroms pore diameter is particularly useful. An example of a commercially available molecular sieve is one which is sold by Linde Air Products Company as their "Type 5A" Molecular Sieve. This material is a synthetic chabasite (zeolite) having pores of about 5 angstroms.

A more complete understanding of the process of the invention can be obtained from a description of the diagrammatic flow diagram of Figures 1 and 2 of which:

Figure 1:
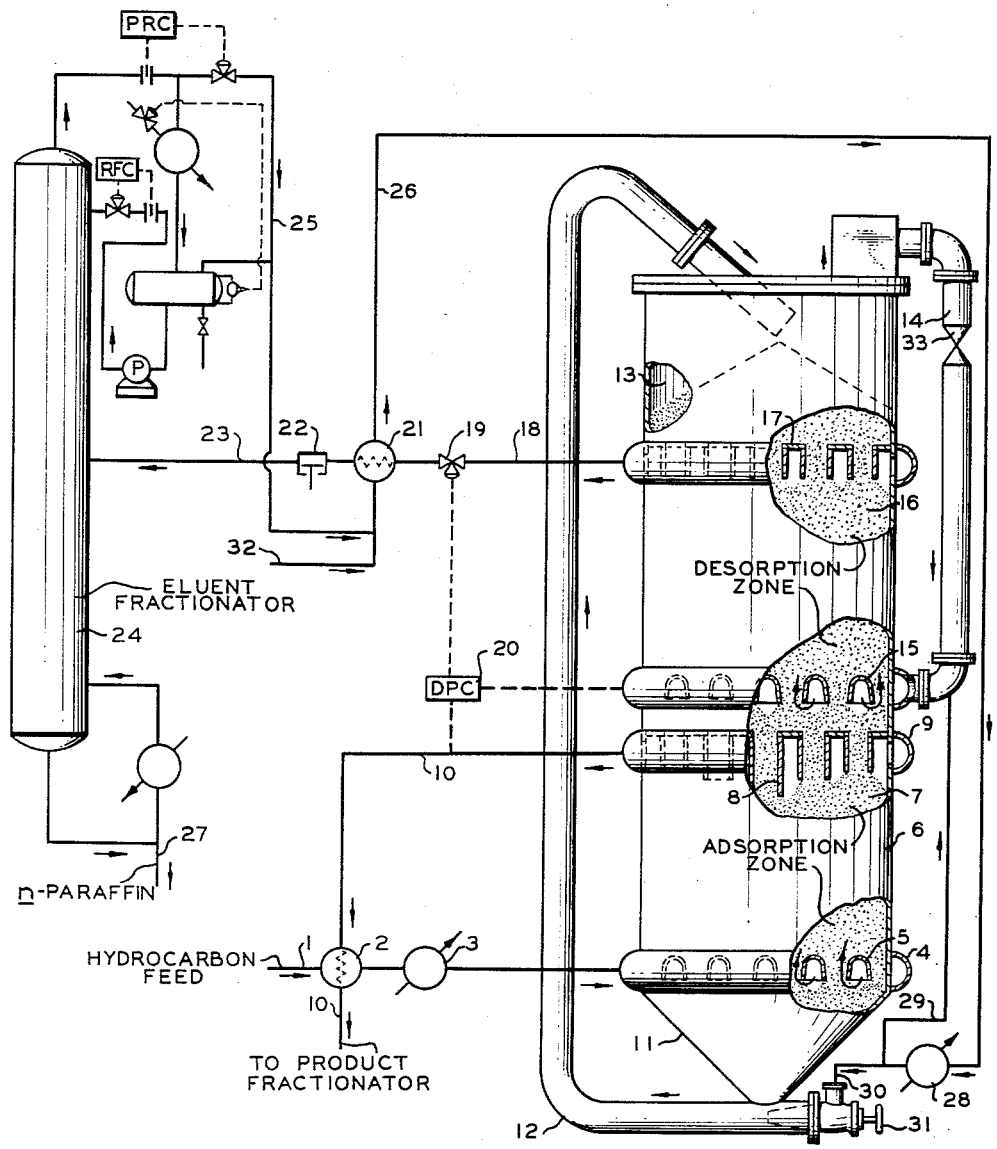
Figure 1 is an embodiment of my invention wherein the desorption zone is superimposed over the adsorption zone.

In Figure 1 a mixed hydrocarbon feed, such as a dehexanized gasoline containing normal paraffins as well as the more desirable non-straight chain hydrocarbons such as aromatics and isoparaffins, passes through line 1 to heat exchanger 2 where it is vaporized and passes to heater 3 where it is heated to the required adsorption temperature, usually 200 to 600° F., preferably 300 to 500° F. The vaporized heated feed then passes into the distribution ring 4 into vapor distributor 5 of vessel 6, the vapors passing upwardly through the adsorption section 7 countercurrent to a downwardly gravitating bed of molecular sieve and then out through vapor disengager 8 to ring 9 and then through line 10 to heat exchanger 2. The heated material in heat exchanger 2 then passes to a product fractionator, not shown. The purpose of the fractionator is to remove from the gasoline eluent normal paraffins contained in the sieve as it passes into section 7, as will be described hereafter. Any separated n-paraffin eluent can be reintroduced to the system through line 32, which is also provided for introduction of makeup eluent. The product gasoline has substantially all of the normal paraffins contained in the original feed removed therefrom, and the desorbent normal paraffin can be fractionated therefrom.

In the absorber section 7 the molecular sieve flows downwardly, entering from above through the combination distributor and vapor disengager 8, and is saturated with a normal paraffin that is lighter than any normal paraffin in the feed. In the adsorption section 7, this lower boiling normal paraffin is displaced by the higher boiling normal paraffins in the feed.

The molecular sieve, saturated with normal paraffins adsorbed from the feed passes downwardly through the funnel shaped section 11 into a gas lift pipe 12 where it is lifted by eluent normal paraffin introduced into line 12 through line 30 and control valve 31. The molecular sieve in lift pipe 12 is delivered to surge chamber 13 in the top of vessel 6. In passing up the gas lift pipe some of the adsorbed normal paraffins are removed by a portion of the lift gas eluent normal paraffin. In surge chamber 13 vapors separate from the adsorbent and pass through line 14 and valve 33 into eluent distributor 15 into desorption zone 16 where they countercurrently contact the down flowing molecular sieve, displacing heavier adsorbed normal paraffins. The upwardly flowing vapors pass out of the vessel through combination adsorbent distributor and vapor disengager 17 through line 18, back pressure control valve 19, heat exchanger 21, compressor 22, pipe 23 and into fractionator 24. Eluent normal paraffin is separated as overhead product from the eluent fractionator. The overhead product is only partially condensed in order to supply reflux to the column and the remainder vapor phase product flows through line 25 to heat exchanger 21, line 26 and heater 28, where the eluent is heated to the desired temperature for the desorption step. Part of these vapors flow through line 30 as gas lift, as already described, and the other portion flows through line 29 to eluent vapor distributor 15.

In a modification of the above-described process, valve 33 is maintained closed so that the vapors separating in surge chamber 13 flow downwardly through the surge bed in 13 and then out through vapor disengager 17. This method of operation is sometimes preferred, since by operation in this manner the vapors flowing into eluent distributor 15 will contain substantially no normal paraffins higher boiling than the eluent.

Compressor 22 maintains a lower suction pressure than in the desorption zone and differential pressure controller 20 actuating valve 19 maintains a pressure in the top of desorption zone 16 sufficiently low that the pressures at distributors 15 and 8 are substantially identical, thus preventing any substantial flow of vapors between the two zones.

Bottom product from the eluent fractionator 24 is principally the normal paraffins removed from the hydrocarbon feed in line 1. If it is desired that these normal paraffins be converted for use as gasoline, they can be reformed or isomerized and the resulting product recycled with the feed in line 1.

If the feed in the process contains pentane as the lowest molecular weight normal paraffin, then the desorbent or eluent is normal butane or a lower molecular weight normal paraffin. In some cases, if desired, a mixture of normal paraffins can be employed as eluent. However, in general in my process, it is desirable to employ as eluent a straight chain hydrocarbon of as high a molecular weight as possible but having fewer carbon atoms than the lowest molecular weight straight chain hydrocarbon in the feed although it is possible for the feed to contain a small percent of the eluent hydrocarbon. This is because the desorbent power of a higher molecular weight normal aliphatic hydrocarbon is greater than the lower ones for any given quantity employed. The feed may be, for instance, a dehexanized catalytic reformate, in other words, a reformate from which normal hexane and all lower boiling normal paraffins have been removed. In such a case, a desirable eluent is normal hexane.

The separation is applicable to admixtures containing straight chain hydrocarbons with other hydrocarbons, such as straight run gasoline, catalytic reformate, kerosene, or other special fractions or admixtures. For instance, a mixture of isopentane and normal pentane can be separated by the process of the present invention employing as the eluent normal butane or propane. In this manner, very high isopentane purities can be obtained; other examples are the separation of isobutane from butane employing propane as the eluent; the separation of benzene from normal hexane employing normal pentane as the eluent in the separation of isooctane and normal octane employing normal heptane as the eluent. In general, my process is applicable to the separation of normal aliphatic hydrocarbons, particularly those containing up to 28 carbon atoms, in admixture with other hydrocarbons, employing as the eluent or desorbent a normal aliphatic hydrocarbon having fewer carbon atoms than any normal aliphatic hydrocarbon in the mixture which it is desired to separate from the feed with the molecular sieve. If it is desired eluent be separated from the non-straight chain product hydrocarbon from which the normal aliphatic hydrocarbons have been removed, then the choice of the desorbent will be influenced by its ease of separation from the product.

Figure 2:
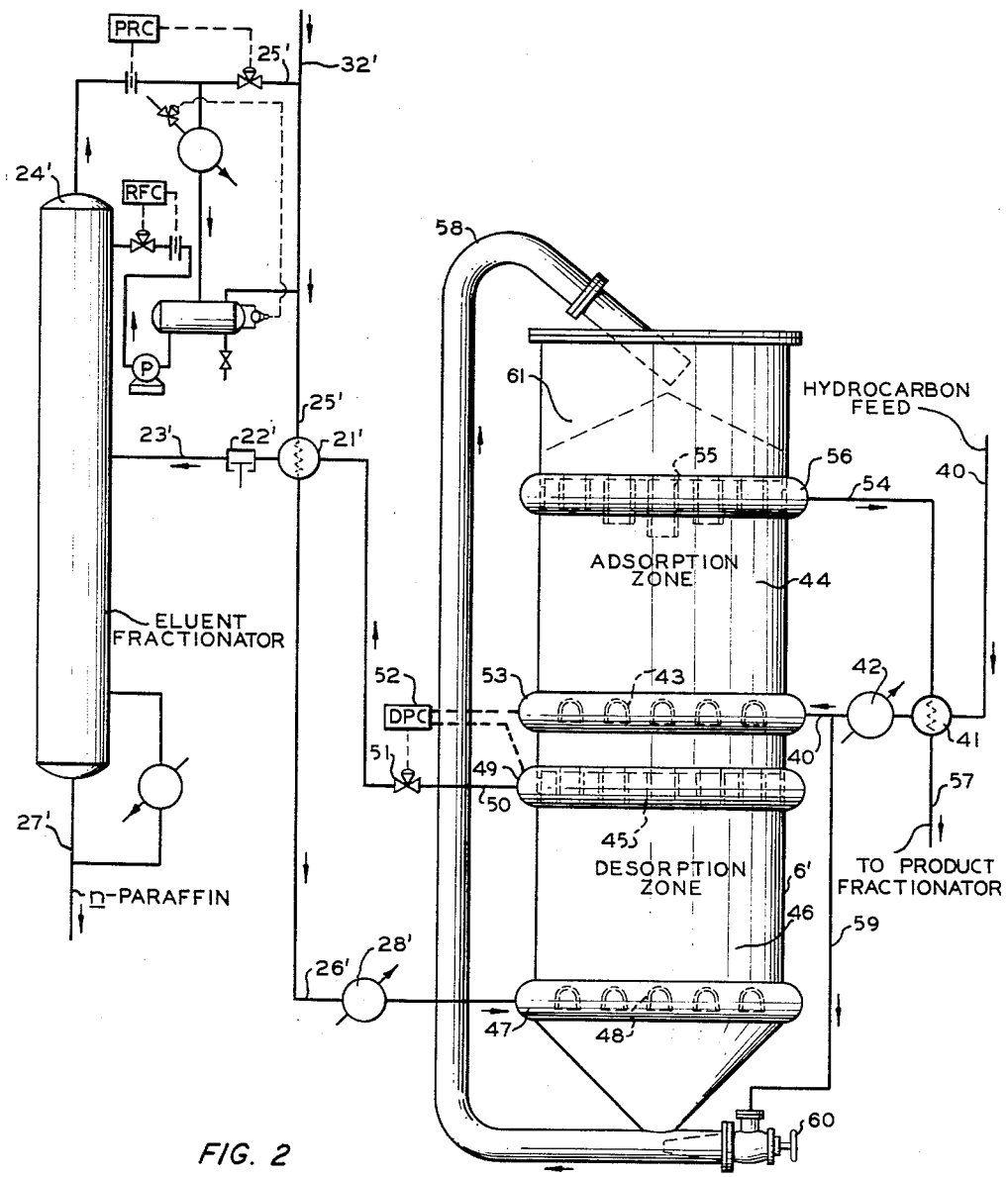
Figure 2 is another embodiment of my invention wherein the adsorption zone is superimposed over the desorption zone.

The process of Figure 2 is similar to that of Figure 1, but the position of the adsorption and desorption zones has been reversed. The feed hydrocarbons containing normal aliphatics are introduced to the system through line 40, distributor ring 53, vaporizer 41 and superheater 42 and distributor 43 from which it flows upwardly through the downwardly flowing molecular sieve in adsorption zone 44 of vessel 61. Downwardly flowing molecular sieve from adsorption zone 44 flows down through combination adsorbent distributor and vapor disengager 45 into desorption zone 46. Eluent hydrocarbon, a normal aliphatic hydrocarbon of lower molecular weight than any normal aliphatic hydrocarbon contained in the feed in line 40 is introduced through line 28' into ring 47 and distributor 48 and flows from 48 upwardly through the adsorbent, displacing previously adsorbed hydrocarbons. Excess eluent and desorbed hydrocarbons flow out through distributor 45, ring 49 to line 50 and through back pressure valve 51 to heat exchanger 21' and then through the compressor and the eluent fractionator as previously described with respect to Figure 1. The eluent fractionator and the lines leading from and to said fractionator operate in the same manner as described with respect to Figure 1. Again, make-up eluent normal aliphatic hydrocarbon can be added through line 32', which corresponds to line 32 of Figure 1. Back pressure control valve 51 is operatively connected to differential pressure controller 52, which is in turn operatively connected to rings 49 and 53 so as to maintain the pressure in 43 and 45 substantially identical and thereby avoid any substantial flow from the absorption zone through line 50 or from the desorption zone into the adsorption zone. Feed hydrocarbon passing up through adsorption zone 44 substantially loses its normal aliphatic hydrocarbons to the sieve, and the unadsorbed components thereof flow into vapor disengager 55 to ring 56 and out through line 54, heat exchanger 41 and line 57 to product fractionation zone, not shown. Molecular sieve flowing from the bottom of vessel 61 is gas lifted through line 58 in a manner similar to that operation described in Figure 1, except that a portion of the feed hydrocarbon in line 40 flows through line 59 and control valve 60 as the lift gas instead of employing a portion of the eluent vapors as the lift gas. In the lift pipe there is a considerable desorption of the eluent hydrocarbon and adsorption of normal aliphatic hydrocarbons contained in the lift gas. The remaining vapors separate from the solids in zone 61, the solids forming a contiguous gravitating bed, and the vapors pass downwardly through the bed to vapor disengager 55 and out through ring 56 and line 54.

In the systems of Figures 1 and 2 just described, it is a feature of this invention that the adsorption and desorption zones are maintained at substantially constant temperatures so that there is not a loss of thermal energy due to cooling the adsorbent for one step and heating it for another step. Both the feed hydrocarbon and the eluent hydrocarbon enter the vessel 6 at substantially the temperature of the gravitating bed of molecular sieve. This is also true in the case of the vapors employed as a lift gas. Since there will usually be a slight heating effect in the adsorption zone, that is, a net exothermic heat of adsorption, the hydrocarbons entering through lines 1 and 40, respectively, of Figures 1 and 2 can be heated slightly below the average desired temperature in the adsorption zone. Similarly, since there will usually be a slight net endothermic heat of desorption in the desorption zone, eluent hydrocarbon entering the desorption zone can be introduced at a temperature somewhat above the desired average temperature in the respective desorption zones. These effects are very small and it is not necessary to make such temperature adjustments.

In the process of the present invention, the entire steps of adsorption and desorption are effected in the vapor phase.

The temperature and pressure at which the adsorption is effected are preferably selected to avoid non-adsorption in the large pores on the one hand and to obtain substantial loading of the small pores on the other hand. For example, in vapor-phase adsorption the former is achieved by choosing pressure and temperature conditions such that the ratio of adsorption pressure to vapor pressure of the feed is below about 0.8, preferably in the range of 0.1 to 0.6. Adequate small pore loading can be obtained by maintaining conditions such that the ratio of the partial pressure of adsorbable components to the vapor pressure to these components is in the range of 0.1 to 0.001 and preferably in the range of 0.1 to 0.01. In general, a temperature of 200° F. to 600° F. will suffice, although higher or lower temperature can be used. Preferably the temperatures are in the range from 300 to 500° F.

In the present process the minimum amount of eluent or desorbent depends upon the eluent used, the material adsorbed on the sieve, the amount of desorption required, and to a minor extent, on desorption temperature and pressure. For practical considerations, at least 1.2 volumes, preferably at least 4 volumes, of eluent are used for each volume of adsorbate contained in the pores of the sieve. This displacement or desorption step can be effected at any desired pressure, say from atmospheric to several hundred pounds, e.g. 600, so long as vapor phase conditions are maintained. Pressures in the range from 0 to 60 p.s.i.g. are usually employed.

EXAMPLE I

In a specific example of my invention according to Figure 1, with valve 33 closed, 10,000 barrels per stream day of a catalytically reformed gasoline containing normal aliphatic hydrocarbons, mainly n-paraffins is charged to the adsorption zone 6. Properties of this reformate are given in the table below.

*Reformate charge to adsorber*

Boiling Range: 170 to 400° F.
Composition (vol. percent):
  n-paraffins ($C_7$ and heavier) _____ 5
  iso-paraffins _____ 37
  Naphthenes _____ 5
  Aromatics (substantially olefin-free) _____ 53

It enters heat exchange 2 at 100° F. at 15 p.s.i.g. and is vaporized therein and superheated in heater 3 to a temperature of 400° F. It enters distributor 5 as a superheated vapor at 5 p.s.i.g. The pressure at the entrance of vapor disengager 8 is 4.75 p.s.i.g., as is the pressure at the outlet of distributor 15, as maintained by differential pressure controller 19. The pressure in the desorber at the vapor outlet is thus maintained at about 4.5 p.s.i.g. The temperature of the molecular sieve in zone 16 and 7 is maintained at an average temperature of about 400° F. with very little variation throughout the bed. About 8,000 pounds of Linde 5A is employed in the system. In order to use a cyclic batch process for removing aliphatics from the same amount of feed at the same rate, about 200,000 pounds of molecular sieve would be required as compared to about 8,000 pounds by means of the present process. Hexane at 400° F. flows into the desorber at a rate of 2175 lbs. per minute, and into the lift pipe at a rate of 10 lbs. per minute. Adsorbent sieve flows up the lift pipe at a rate of 300 lbs. per minute.

In the specific example just described, vessel 6 is five feet in diameter and sixteen feet high, and the adsorbent lift pipe is ten inches inside diameter.

EXAMPLE II

To illustrate the effect of various n-paraffins as a displacement material, Linde 5A adsorbent material was saturated with n-heptane. This saturated material was treated with various n-paraffins at 212° and 14.7 p.s.i.a. (vapor phase condition). The results are shown in Table I. The treatments were for equal periods of time without reaching equilibrium conditions.

| Percent of normal heptane replaced | Vol. of displacing paraffins per vol. of heptane replaced | Displacing normal (eluent) paraffins |
|---|---|---|
| 30 | 5.6 | n-butane. |
| 60 | 5.7 | n-pentane. |
| 90 | 9.0 | Do. |
| 60 | 1.5 | n-hexane. |
| 90 | 2.5 | Do. |

From the above table it can be seen that the higher molecular weight materials are more effective than are the lower molecular weight ones and that with a higher ratio of displacement fluid, greater separation is obtained.

EXAMPLE III

A 5 angstrom molecular sieve was saturated with n-paraffins using a platformer reformate. Vapor phase butane desorbed 20 percent and 31 percent of the adsorbed n-paraffin at 380° and 14.7 p.s.i.a. and at 350° F. and 100 p.s.i.a. respectively with 5 volumes of normal butane per volume of adsorbed normal paraffin.

EXAMPLE IV

In the above examples, the desorption was carried out for a reasonable length of time as would be done in commercial practice. To illustrate the desorption at equilibrium conditions and various temperatures, the following data is presented to show the amount of eluent per volume of adsorbate removed required for various percent recoveries. The same type of molecular sieve adsorbent was used.

| Adsorbate | Eluent | Temp., °F. | Vol. Eluent/Vol. Adsorbate Removed | | | | | |
|---|---|---|---|---|---|---|---|---|
| | | | 55% | 74% | 95% | 98% | 99% | 100% |
| n-pentane | n-butane | 300 | | | | | | 3.8 |
| n-hexane | do | 300 | | | | | | 7.5 |
| n-heptane | do | 500 | 5.0 | 7.5 | | | | 15.0 |
| n-octane | do | 300 | | | | | | 29.0 |
| n-hexane | n-pentane | 400 | | | | | | 3.3 |
| n-heptane | do | 400 | 1.5 | 2.2 | 4.2 | 5.0 | 6.0 | |
| n-octane | do | 400 | 3.3 | 5.3 | 9.2 | 10.6 | 11.7 | |
| n-nonane | do | 400 | 4.5 | 7.6 | 15.0 | 17.0 | 19.0 | |
| n-decane | do | 400 | | | | | | 24.5 |
| n-undecane | do | 400 | | | | | | 39.5 |
| n-octadecane | n-tetradecane | 550 | | | | | | 6.6 |
| n-eicosane | do | 550 | | | | | | 13.0 |

EXAMPLE VI

To show the effectiveness of the 5A molecular sieve in separating even very large molecules from aromatics, n-octacosane was removed from a toluene solution. The following data was obtained.

| Binary hydrocarbon mixture | Feed Composition | | Equilibrium Comp. in presence of 5 A sieve, Vol. percent |
|---|---|---|---|
| | Liq., Vol. percent | Total cc. | |
| n-octacosane | 5.9 | 7.4 | 0.4 |
| Toluene | 94.1 | | 99.6 |

To illustrate the working of this invention we have used one molecular sieve using various n-paraffins, temperatures and pressures to show the effect of these variables. It will be understood by those skilled in the art that various sieve sizes can be used and will be chosen depending upon the desired separation. Other modifications will be obvious to those skilled in the art.

It will be apparent to those skilled in the art that variations and modifications of the invention can be made from a study of the foregoing disclosure. Such variations and modifications are believed to be clearly within the spirit and scope of the invention.

I claim:

1. A process wherein a single contiguous, gravitating bed of a zeolite molecular sieve having a rigid three-dimensional structure passes in the order named through an upper solids distributing zone, then directly through a first vapor-solids separation zone, then directly through a first vapor-solids countercurrent contacting desorption zone, then directly through a zone of introduction of a first vapor stream containing a first normal aliphatic hydrocarbon, then directly through a second vapor-solids separation zone, then directly through a second vapor-solids countercurrent contacting adsorption zone, then directly through a zone of introduction of a second vapor feed stream to be separated containing at least one heavier normal aliphatic hydrocarbon in admixture with at least one non-straight chain hydrocarbon and having a greater number of carbon atoms than any normal aliphatic hydrocarbon in said first stream, and then directly through a bottom solids removal zone; countercurrently contacting said first vapor stream with said sieve in said desorption zone, thereby desorbing said heavier normal aliphatic hydrocarbon from said sieve and collecting same in vapor form in said first separation zone; counter-currently contacting said second vapor stream with said sieve in said adsorption zone and adsorbing said heavier normal aliphatic hydrocarbon on said sieve, while desorbing said first normal aliphatic hydrocarbon from said sieve and collecting same in vapor form together with said vapors of said non-straight chain hydrocarbon in said second separation zone; removing solids from the bottom of said bed of gravitating sieve and introducing into said solids another portion of said first vapor stream as a lift gas for said solids and lifting said solids to the top of said bed, and during said lifting desorbing a portion of said heavier normal aliphatic hydrocarbon from said sieve and separating at least most of said lift vapors from said solids; removing the vapors collected in said second separation zone and separating said collected vapors of said non-straight chain hydrocarbon from said first normal aliphatic hydrocarbon therein; and recovering vapors of said separated non-straight chain hydrocarbons and said collected vapors of said heavier normal aliphatic hydrocarbon as products of the process; the said molecular sieve solids being maintained at substantially constant temperature throughout said process.

2. A process wherein a single contiguous, gravitating bed of a zeolite molecular sieve having a rigid three-dimensional structure passes in the order named through an upper solids distributing zone, then directly through a first vapor-solids separation zone, then directly through a first vapor-solids countercurrent contacting adsorption zone, then directly through a zone of introduction of a first vapor feed stream to be separated containing at least one first normal aliphatic hydrocarbon having a greater number of carbon atoms than any normal aliphatic hydrocarbon in a second vapor stream mentioned hereafter in admixture with at least one non-straight chain hydrocarbon, then directly through a second vapor-solids separation zone, then directly through a second vapor-solids countercurrent contacting desorption zone, then directly through a zone of introduction of a second vapor stream containing a second normal aliphatic hydrocarbon, and then directly through a solids removal zone; countercurrently contacting said first vapor stream with said sieve in said adsorption zone and adsorbing said first normal aliphatic hydrocarbon on said sieve while desorbing said second normal aliphatic hydrocarbon from said sieve, collecting said desorbed second normal aliphatic hydrocarbon as vapors together with said vapors of said non-straight chain hydrocarbon in said first separation zone; countercurrently contacting said second vapor stream with said sieve in said desorption zone, thereby desorbing said first normal aliphatic hydrocarbon from said sieve and adsorbing at least a portion of said second normal aliphatic hydrocarbon on said sieve, collecting said desorbed normal aliphatic as vapors in said second separation zone; removing solids from the bottom of said bed of gravitating sieve and introducing into said solids another portion of said first vapor feed stream as a lift gas for said solids and lifting said solids to the top of said bed, during said lifting adsorbing at least a portion of said normal aliphatic hydrocarbon from said first stream with said sieve and separating vapors from solids in the top of said bed; separating said collected non-straight chain hydrocarbon from said second normal aliphatic hydrocarbon collected in said first separation zone; and recovering said separated non-straight chain hydrocarbons and said collected vapors of said first normal aliphatic hydrocarbon as products of the process; the said molecular sieve solids being maintained at substantially constant temperature throughout said process.

3. A process wherein a contiguous, gravitating bed of a zeolite molecular sieve having a rigid three-dimensional structure passes in the order named through an upper solids distributing zone, then directly through a first vapor-solids separation zone, then directly through a first vapor-solids countercurrent contacting desorption zone, then directly through a zone of introduction of a first vapor stream containing a first normal aliphatic hydrocarbon, then directly through a second vapor-solids separation zone, then directly through a second vapor-solids countercurrent contacting adsorption zone, then directly through a zone of introduction of a second vapor-stream containing at least one heavier normal aliphatic hydrocarbon in admixture with at least one non-straight chain hydrocarbon and having a greater number of carbon atoms than any normal aliphatic hydrocarbon in said first stream, and then directly through a bottom solids removal zone; countercurrently contacting said first vapor stream with said sieve in said desorption zone, thereby desorbing said heavier normal aliphatic hydrocarbon from said sieve and collecting same in vapor form in said first separation zone; controlling the rate of withdrawal of vapors collected in said first separation zone in response to the pressure differential between said second separation zone and said zone of introduction of said first vapor stream; countercurrently contacting said second vapor stream with said sieve in said adsorption zone and adsorbing said heavier normal aliphatic hydrocarbon on said sieve, while desorbing said first normal aliphatic hydrocarbon from said sieve and collecting same in vapor form together with said vapors of said non-straight chain hydrocarbon in said second separation zone; removing solids from the bottom of said bed of gravitating sieve and introducing into said solids another portion of said first vapor stream as a lift gas for said solids and lifting said solids to the top of said bed, and separating at least most of said lift vapors from said solids; removing the vapors collected in said second separation zone and separating said collected vapors of said non-straight chain hydrocarbon from said first normal aliphatic hydrocarbon therein; and recovering vapors of said separated non-straight chain hydrocarbons and said collected vapors of said heavier normal aliphatic hydrocarbon as products of the process.

4. A process wherein a contiguous, gravitating bed of zeolite molecular sieve having a rigid three-dimensional structure passes in the order named through an upper solids distributing zone, then directly through a first vapor-solids separation zone, then directly through a first vapor-solids countercurrent contacting adsorption zone, then directly through a zone of introduction of a first vapor stream containing at least one first normal aliphatic hydrocarbon having a greater number of carbon atoms than any normal aliphatic hydrocarbon in a second vapor stream mentioned hereafter in admixture with at least one non-straight chain hydrocarbon, then directly through a second vapor-solids separation zone, then directly through a second vapor-solids countercurrent contacting desorption zone, then directly through a zone of introduction of a second vapor stream containing a second normal aliphatic hydrocarbon, and then directly through a solids removal zone; countercurrently contacting said first vapor stream with said sieve in said adsorption zone and adsorbing said first normal aliphatic hydrocarbon on said sieve while desorbing said second normal aliphatic hydrocarbon from said sieve, collecting said desorbed second normal aliphatic hydrocarbon as vapors together with said vapors of said non-straight chain hydrocarbon in said first separation zone; countercurrently contacting said second vapor stream with said sieve in said desorption zone, thereby desorbing said first normal aliphatic hydrocarbon from said sieve and adsorbing at least a portion of said second normal aliphatic hydrocarbon on said sieve, collecting said desorbed normal aliphatic hydrocarbon as vapors in said second separation zone; controlling the rate of withdrawal of vapors collected in said second separation zone in response to the pressure differential between said second separation zone and said zone of introduction of said first vapor stream; removing solids from the bottom of said bed of gravitating sieve and introducing into said solids another portion of said first vapor stream as a lift gas for said solids and lifting said solids to the top of said bed, and separating vapors from solids in the top of said bed; separating said collected non-straight chain hydrocarbon from said second normal aliphatic hydrocarbon collected in said first separation zone; and recovering said separated non-straight chain hydrocarbons of said collected vapors of said first normal aliphatic hydrocarbon as products of the process.

5. A process of claim 1 wherein said first vapor stream is a first normal paraffin eluent and wherein said second vapor stream is a gasoline containing normal paraffins heavier than said first normal paraffin admixed with non-straight chain hydrocarbons.

6. A process of claim 5 wherein said first normal paraffin eluent is n-hexane.

7. A process of claim 5 wherein said first normal paraffin eluent is n-butane.

8. Process of claim 1 wherein said molecular sieve is a chabasite having a pore diameter of about 5 angstrom units.

9. A process of claim 5 wherein said normal paraffin vapor eluent is employed in said desorption zone in a ratio of at least 1.2 volumes of said first n-paraffin for each volume of vapor adsorbed on said sieve.

10. A process of claim 5 wherein said normal paraffin vapor eluent is employed in said desorption zone in a ratio of at least 4 volumes of said first n-paraffin for each volume of vapor adsorbed on said sieve.

11. A process of claim 1 wherein said first vapor stream consists essentially of n-butane and said second vapor stream consists essentially of a mixture of n-pentane and isopentane.

References Cited in the file of this patent

UNITED STATES PATENTS

| | | |
|---|---|---|
| 2,425,535 | Hibshman | Aug. 12, 1947 |
| 2,495,842 | Gilliland | Jan. 30, 1950 |
| 2,522,426 | Black | Sept. 12, 1950 |
| 2,539,005 | Berg | Jan. 23, 1951 |
| 2,818,455 | Ballard et al. | Dec. 31, 1957 |
| 2,834,429 | Kinsella et al. | May 13, 1958 |
| 2,891,902 | Hess et al. | June 23, 1959 |